United States Patent [19]

Sugimura

[11] 4,452,275

[45] Jun. 5, 1984

[54] SAFETY DEVICE FOR AN ACCUMULATOR

[76] Inventor: Nobuyuki Sugimura, 308, Mabase, Shimizu-shi, Shizuoka-ken, Japan

[21] Appl. No.: 490,031

[22] Filed: Apr. 29, 1983

[30] Foreign Application Priority Data

Nov. 17, 1982 [JP] Japan ................................ 57-200456

[51] Int. Cl.$^{3}$ ................................................ F16L 55/04

[52] U.S. Cl. .................................... 138/30; 220/89 B; 137/74

[58] Field of Search .............. 138/30; 220/85 B, 89 B; 137/72, 73, 74

[56] References Cited

U.S. PATENT DOCUMENTS

| | | | |
|---|---|---|---|
| 1,303,248 | 5/1919 | Breidenbach | 137/74 |
| 2,271,786 | 2/1942 | Watkins | 137/74 X |
| 3,115,162 | 12/1963 | Posh | 138/30 |
| 3,245,578 | 4/1966 | Sutton | 220/89 B |
| 3,283,786 | 11/1966 | Irwin | 138/30 |
| 3,911,948 | 10/1975 | Collins et al. | 137/74 X |
| 4,059,125 | 11/1977 | Sugimura et al. | 137/73 |

FOREIGN PATENT DOCUMENTS

| | | | |
|---|---|---|---|
| 1093181 | 5/1955 | France | 220/85 B |

*Primary Examiner*—James E. Bryant, III
*Attorney, Agent, or Firm*—Wood, Dalton, Phillips, Mason & Rowe

[57] ABSTRACT

A flanged cylindrical valve casing is loosely inserted into a bore of a pressure container from its inside towards its outside. A fuse packing is interposed between the flange and the inside surface of the pressure container so that when this fuse packing has molten the flange may make direct contact with the pressure container, to form a passageway between the flange and the pressure container communicating with the inside of the pressure container, and this passageway communicates with a gap clearance around the cylindrical valve casing as well as the outside of the pressure container.

7 Claims, 15 Drawing Figures

SAFETY DEVICE FOR AN ACCUMULATOR

Figure 1:
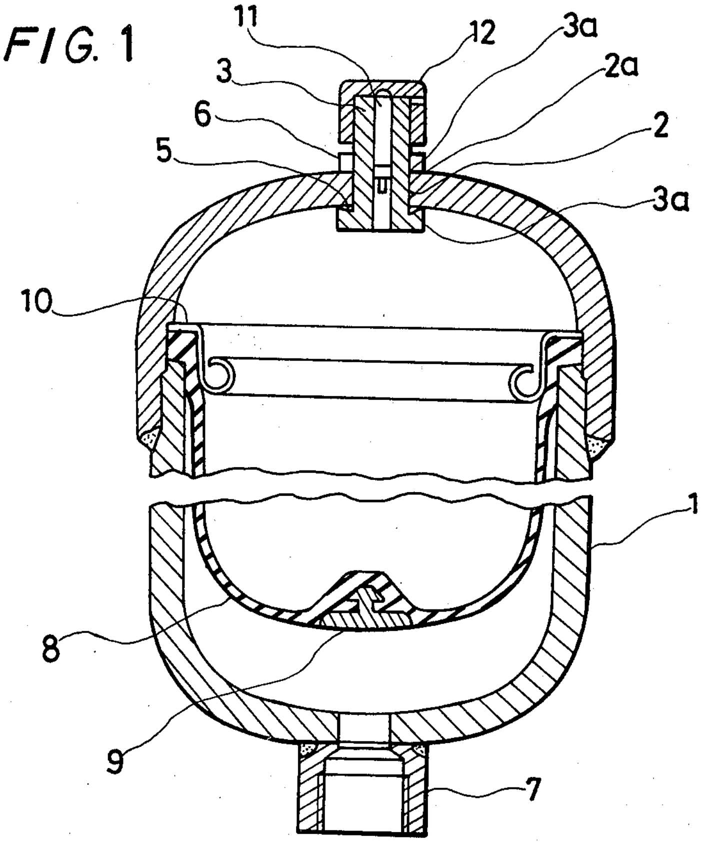

The present invention relates to a safety device for preventing an accumulator from bursting when the accumulator has reached a high temperature due to a fire or the like.

In the event that various equipment associated with an accumulator encounters a fire, the inner pressure of the gas bladder contained in the accumulator rises with the temperature to create a risk of bursting.

More particularly, since a safety factor of a pressure container is regulated to be 3–4.5 times as large as the designed pressure, if a temperature . However, since the pressure of a nitrogen gas filled bladder at 300° C., is twice as large as the pressure at the room temperature and also since the degree of duration against a pressure of the pressure container is lowered with respect to the normal time, the safety factor of the pressure container is lowered. Therefore, for the purpose of preventing bursting of an accumulator caused by a temperature rise, as during a fire, a safety valve is mounted to a pressure container of an accumulator. In a safety valve in the prior art, a meltable metal is used as a valve seat in a valve so that when a temperature has reached 160°-170° C. the valve seat may melt to automatically open the valve (See U.S. Pat. No. 4,059, 125).

However, since this safety valve necessitates special working of a valve, the manufacturing cost of the safety device becomes expensive.

It is one object of the present invention to provide a safety device in which a less expensive valve such as that used in a tire tube of the conventional car can be used.

Another object of the present invention is to preliminarily prevent a pressure container from bursting when equipment associated with an accumulator has been heated due to a fire or the like.

According to one feature of the present invention, there is provided a safety device for an accumulator in which a flanged cylindrical valve casing is loosely inserted into a bore of a pressure container from its inside towards its outside so as to form a gap clearance between the peripheral wall of said bore and the peripheral wall of the valve casing. A packing having a capability to serve as a fuse is interposed between the inside surface of said pressure container and the flange of the cylindrical valve casing, and on the outside of said pressure casing a fastening nut is threadedly mated with the valve casing. When the inside surface of said pressure container and said flange has made direct contact with each other, a passageway for communicating said gap clearance and the inside of the pressure container with each other can be formed between the inside surface of the pressure container and said flange.

When the pressure container has been heated due to a fire or the like, the above-mentioned packing having a capability of a fuse will melt, hence the cylindrical valve casing is moved towards the outside by the corresponding dimension. Accordingly a passageway for gas between the inside and the outside of the pressure container is formed, and thereby the pressure in the inside space is prevented from excessively rising.

Figure 2:
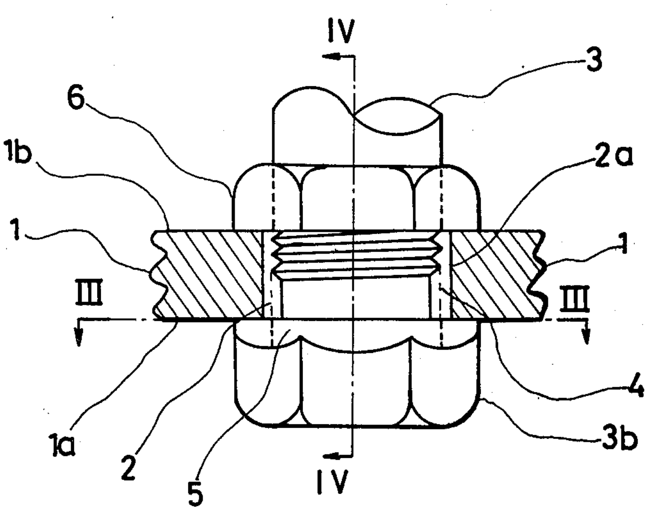
Figure 3:
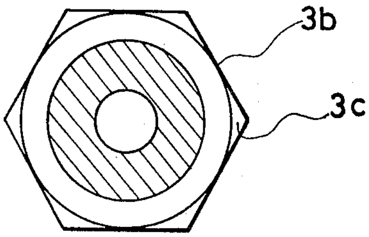
Figure 4:
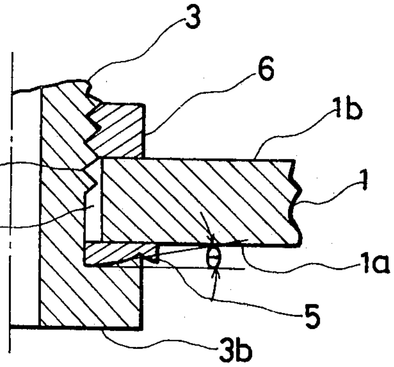
Figure 5:
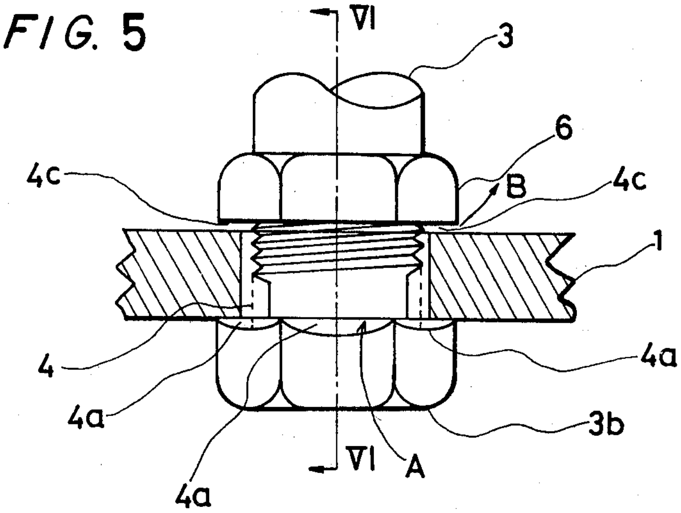
Figure 6:
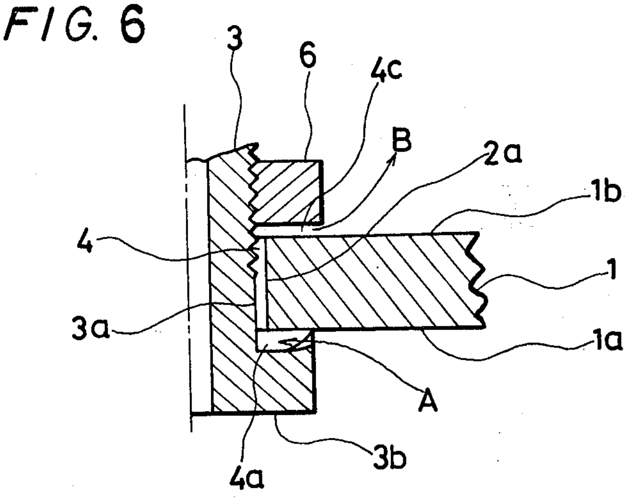
Figure 7:
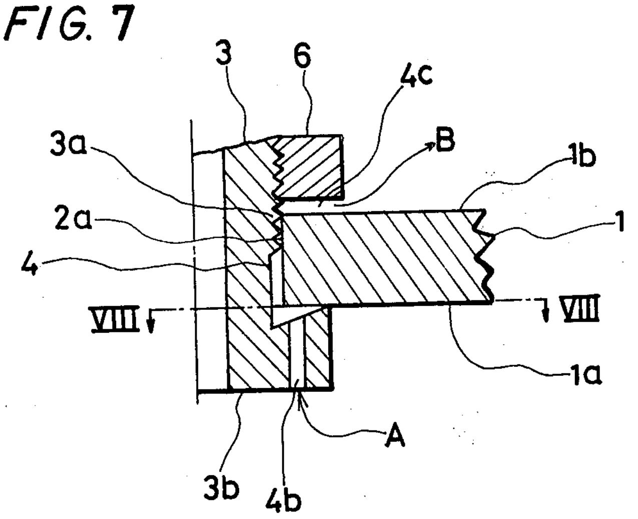
Figure 8:
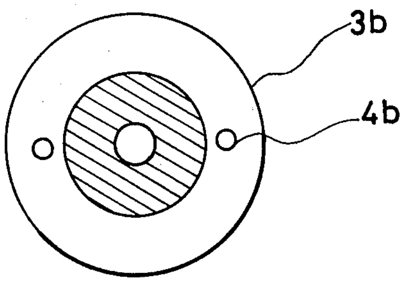
Figure 9:
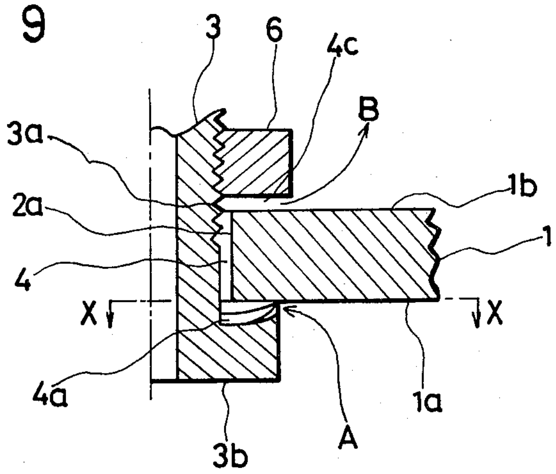
Figure 10:
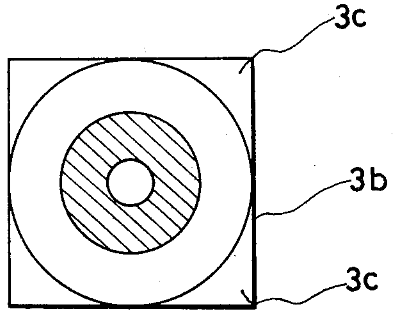
Figure 11:
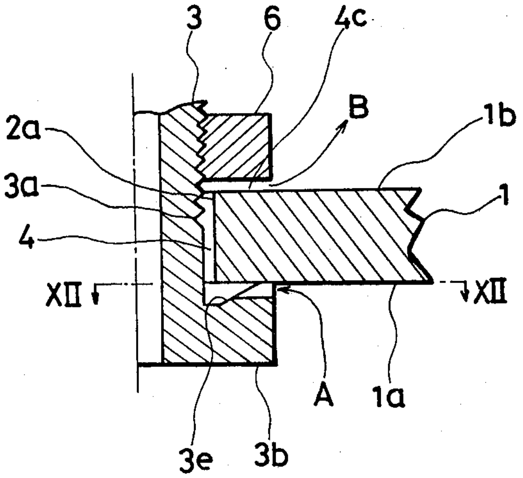
Figure 12:
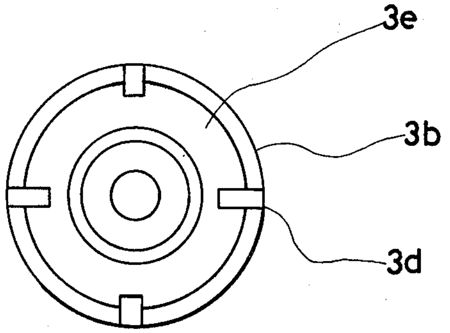

The above-mentioned and other objects, features and advantages of the present invention will become more apparent by reference to the following description of preferred embodiments of the invention taken in conjunction with the accompanying drawings, wherein:

FIG. 1. is a longitudinal cross-section view of an accumulator provided with a safety device according to the present invention, FIG. 2 is a detailed cross-section view of a part shown in FIG. 1, FIG. 3 is a transverse cross-section view taken along line III—III in FIG. 2, FIG. 4 is a longitudinal cross-section view taken along line IV—IV in FIG. 2, FIG. 5 is a detailed cross-section view of a part shown in FIG. 1 but in a different state, FIG. 6 is a longitudinal cross-section view taken along line VI—VI in FIG. 5, FIG. 7 is a longitudinal cross-section view of another preferred embodiment under the condition corresponding to FIG. 6, FIG. 8 is a transverse cross-section view taken along line VIII—VIII in FIG. 7, FIG. 9 is a longitudinal cross-section view of still another preferred embodiment under the condition corresponding to FIG. 6, FIG. 10 is a transverse cross-section view taken along line X—X in FIG. 9, FIG. 11 is a longitudianal cross-section view of yet another preferred embodiment under the condition corresponding to FIG. 6, FIG. 12 is a transverse cross-section view taken along line XII—XII in FIG. 11, and FIGS. 13 to 16 are longitudinal cross-section views of still other preferred embodiments under the condition corresponding to FIG. 6.

According to the present invention, a flanged valve casing 3 is loosely inserted into a bore 2 at the top of a pressure container 11 from its inside towards its outside so as to form a gap clearance (for instance, 0.25 mm in thickness) 4 between the wall 2a of the bore and the peripheral wall 3a of the valve casing. A fuse packing 5 is interposed between the inside surface 1a of the pressure container and a flange 3b. On the outside of the pressure container 1 a fastening nut 6 is threadedly mated with the valve casing 3, and a passageway 4a (FIG. 5) is formed in the flange 3b so that when the inside surface 1a of the pressure container 1 is brought into direct contact with the flange 3b the passageway 4a may communicate the gap clearance 4 with the inside surface 1a of the pressure container 1, whereby a safety device for an accumulator can be formed. It is to be noted that reference numeral 7 designates an inlet/outlet port of a pressurized liquid to and from the pressure container 1, reference numeral 8 designates a gas bladder, numeral 9 designates a valve body, numeral 10 designates a gas bladder cap, numeral 11 designates a valve and numeral 12 designates a protective nut.

Explaining now the operation of the present invention, the protective nut 12 is removed, and after a pressurized gas has been injected through the valve 11 into the bladder 8, the protective nut 12 is threadedly mated and fastened.

If an ambient temperature of the accumulator rises from the cause of a fire and the like, the pressurized gas within the bladder 8 also becomes a high and, the temperature within the pressurized container 1 also rises. If a predetermined temperature, for instance 165° C. is reached, then the fuse packing 5 is molten, and due to the inner pressure while the fuse packing 5 is being pushed out the whole valve casing 3 moves from the state shown in FIG. 2 to the state shown in FIG. 5 where the inside surface 1a of the pressurized container 1 makes direct contact with an upper surface of an angular portion *3c* (FIG. 3) of the flange *3b*, hence between the angular portions *3c* paths *4a* are formed communicating with the gap clearance. Also, between the outside surface *1b* of the pressurized container 1 and the fastening bolt 6 a space *4c* (FIG. 5) is formed communicating with the gap clearance 4. A high pressure gas (for instance at 100 $kg/cm^2$) enters into the path *4a* in the direction of an arrow A, passes through the gap clearance 4, and then it is ejected from the space *4c* into the atmosphere along the direction indicated by an arrow B.

As described previously, a safety factor of a pressure container is regulated to be 3–4.5 times as large as a designed valve, and the above-mentioned fuse packing must melt at a pressure lower than the designed pressure of the pressurized container. Accordingly, a melting temperature of the fuse packing 5 is selected to be a temperature of 180° C. or less so that the gas pressure within the gas bladder 8 does not exceed the designed pressure, and so that no trouble may occur during normal use, the fuse packing 5 should also have a melting point of 120° C. or higher. Therefore, nylon may be used.

If the upper surface of the aforementioned flange *3b* is inclined by an angle $\theta$ (FIG. 4) so as to be raised towards the outside, then when the fuse packing 5 is interposed and the valve casing 3 is fastened, the packing would not squeeze out externally of the flange *3b*, and so, a sealing effect is increased. This inclination angle should be preferably selected at nearly 10 degrees.

In order to improve ejection of a pressurized gas, the passage *4a* can be formed in a number of ways.

As shown in FIGS. 7 and 8, the passage is formed of a concave surface shaped on an upper surface of a flange *3b* and a communication hole *4b* extending from the lower surface of the flange *3b* to its upper surface. In the alternative embodiment shown in FIGS. 9 and 10, the flange *3b* is formed in a polygonal shape and a concave surface formed between the apexes of the angular portions *3b* is used as a passageway *4a*. Still another embodiment is shown in FIGS. 11 and 12, where a passageway *4a* is formed by a concave conical surface *3e* formed on the upper surface of the flange *3b* and radial slots *3d* in the flange *3b*. Furthermore, the flange *3b* could be formed in the following manner while an inclined surface is formed around the inner side surface of the bore 2 of the pressurized container 1.

Figure 13:
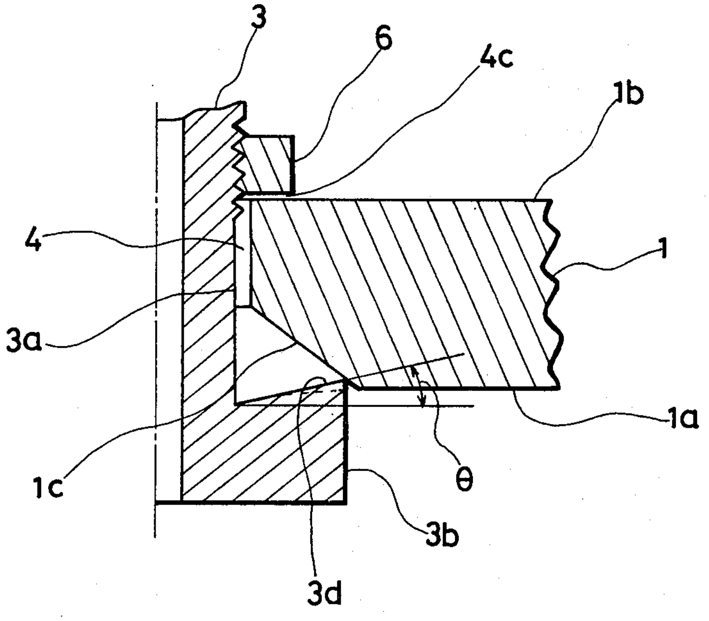
Figure 14:
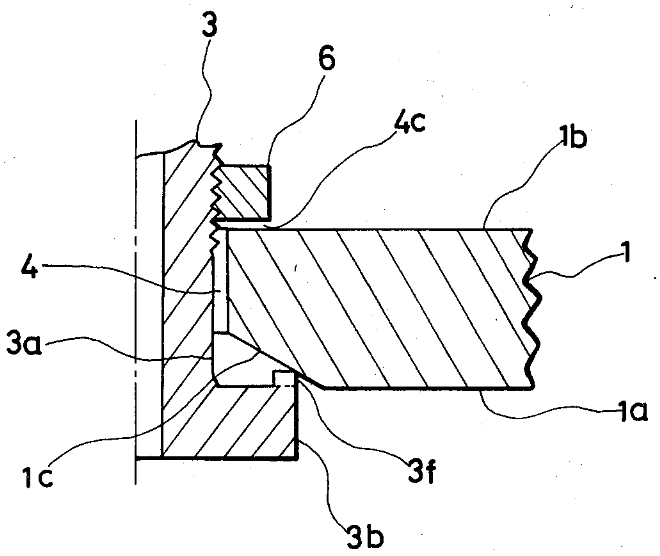

More particularly, as shown in FIG. 13, an inclination $\theta$ and grooves *3d* are formed on the upper surface of the flange *3b* in FIG. 6, so that an end portion of the upper surface may butt against the inclined surface *1c*. Alternatively, as shown in FIG. 14, the upper surface of the flange *3b* is formed horizontally together with the lower surface, and a protrusion *3f* is formed on the edge portion of the upper surface so that the protrusion *3f* on the upper surface may butt against the inclined surface *1c*.

Figure 15:
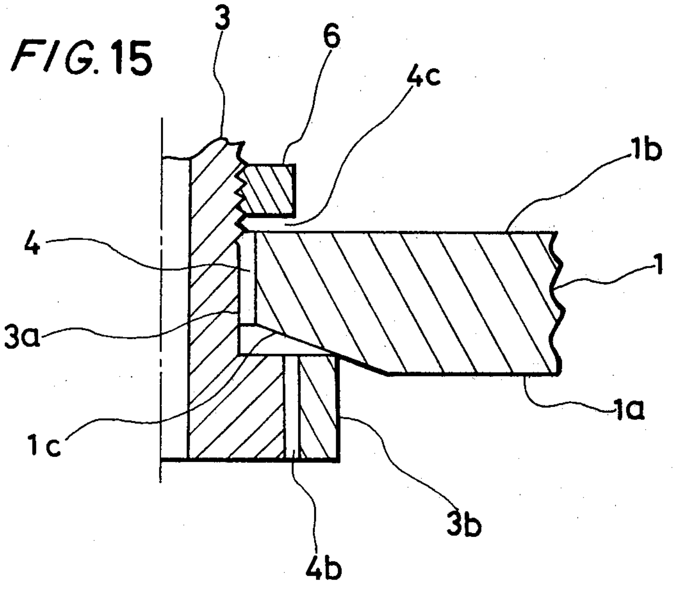

Furthermore, as shown in FIG. 15, the upper and lower surfaces of the flange *3b* in FIG. 7 could be formed both horizontally to make the edge portion of said upper surface butt against the inclined surface *1c*.

Since the present invention is characterized by the above-mentioned features, there is provided a safety device in which an action of a safety valve can be achieved by making use of a cheap valve as is used in a tire tube of the conventional car, without using an expensive valve.

In addition, the fuse packing serves as a temperature fuse, and if equipment associated with the accumulator is heated due to a fire or the like, then the inside surface of the pressurized container and the flange makes direct contact. This forms a passageway communicating a gap clearance with the inside of the pressure container at the flange, so that a high pressure gas within the pressure container is ejected through the passageway to the atmosphere, and therefore, the pressure within the pressure container is lowered and bursting of the pressure container can be prevented.

What is claimed is:

1. A safety device for an accumulator, comprising:
   - a pressure container (1) having a bore (2);
   - a valve casing (3) having a flange (*3b*), said casing (3) being inserted into the bore (2) in the pressure container (1) from the inside of the container (1) toward its outside to form a gap clearance (4) between a wall (*2a*) of said bore (2) and a peripheral wall (*3a*) of the valve casing (3);
   - a fuse packing interposed between the inside surface (*1a*) of said pressure container (1) and the flange (*3b*);
   - a fastening nut (6) threadedly mated with the valve casing (3) and engaging the outside of the container (1) around the bore to secure the fuse packing between the container (1) and the flange (*3b*);
   - wherein melting of the packing disengages the nut (6) from the outside of the container (1) and brings the inside surface (*1a*) of said pressure container (1) into direct contact with the flange (*3b*) with a passageway (*4a*) formed therebetween to communicate said gap clearance (4) with the inside (*1a*) of the pressure container (1).
2. A safety device for an accumulator as claimed in claim 1, wherein the flange (*3b*) is concave on the side contacting the container (1) and includes a communication hole (*4b*) therethrough to form said passageway (*4a*).
3. A safety device for an accumulator as claimed in claim 1, further comprising an inclined surface (*1c*) in the inside of the container (1) around the bore (2), and an inclination on the flange (*3b*) forming an edge portion about the flange (*3b*), whereby the edge portion may abut against the inclined surface (*1c*) when the packing melts.
4. A safety device for an accumulator as claimed in claim 1, in which an inclined surface (*1c*) is formed in the inside of the container (1) around the bore (2), and the flange (*3b*) has a protrusion (*3f*) which may abut against the inclined surface (*1c*) when the fuse packing melts.
5. A safety device for an accumulator as claimed in claim 1, further comprising an inclined surface (*1c*) in the inside of the container (1) around the inner side surface of the bore (2), wherein the flange (*3b*) is substantially planar adjacent to said surface (*1c*) and the edge of the planar portion may abut against the inclined surface (*1c*) when the packing melts.
6. A safety device for an accumulator as claimed in claim 1, in which said flange (*3b*) has a polygonal shape, and the passageway (*4a*) is a concave surface formed between the apexes of the angular portions.
7. A safety device for an accumulator as claimed in claim 1, in which the passageway (*4a*) is formed of a concave conical surface (*3e*) formed on the inner surface of the flange (*3b*) and radial grooves (*3d*) formed in the flange (*3b*).

* * * * *